US011006180B2

(12) United States Patent
Boniface et al.

(10) Patent No.: US 11,006,180 B2
(45) Date of Patent: May 11, 2021

(54) MEDIA CLIPPER SYSTEM

(71) Applicant: Broadnet Teleservices, LLC, Highlands Ranch, CO (US)

(72) Inventors: David Boniface, Centennial, CO (US); Christopher Silveri, Centennial, CO (US)

(73) Assignee: Broadnet Teleservices, LLC, Highlands Ranch, CO (US)

( * ) Notice: Subject to any disclaimer, the term of this patent is extended or adjusted under 35 U.S.C. 154(b) by 86 days.

(21) Appl. No.: 15/967,988

(22) Filed: May 1, 2018

(65) Prior Publication Data
US 2018/0332354 A1    Nov. 15, 2018

Related U.S. Application Data

(60) Provisional application No. 62/504,906, filed on May 11, 2017.

(51) Int. Cl.
H04N 21/472      (2011.01)
H04N 21/4728     (2011.01)
H04N 21/4402     (2011.01)
H04N 21/858      (2011.01)
H04N 21/435      (2011.01)
(Continued)

(52) U.S. Cl.
CPC ......... H04N 21/4728 (2013.01); G11B 27/10 (2013.01); H04N 21/2187 (2013.01); H04N 21/234309 (2013.01); H04N 21/2743 (2013.01); H04N 21/435 (2013.01);
(Continued)

(58) Field of Classification Search
CPC ............ H04N 21/2187; H04N 21/435; H04N 21/440218; H04N 21/4728; H04N 21/4788; H04N 21/8586; H04N 21/234309; H04N 21/2743; H04N 21/8549; G11B 27/10
See application file for complete search history.

(56) References Cited

U.S. PATENT DOCUMENTS 10,057,651 B1 *  8/2018  Singh ................. H04N 21/4788
2003/0028893 A1 *  2/2003  Addington ......... H04N 21/8456
                                                      725/115
(Continued)

OTHER PUBLICATIONS https:www.smpte.org/lifewithoutsmpte/SMPTETimeCode.
https://mpe.berklee.edu/documents/curriculum/materials/mp-212/Course%20Handouts/SMPTPE%Made%20Easy.pdf.

Primary Examiner — Nicholas T Corbo
(74) Attorney, Agent, or Firm — Holzer Patel Drennan

(57) ABSTRACT

The disclosed technology includes a system and method for selecting highlight media clips and posting the highlight media clips to social media platforms. In one implementation, a method includes receiving, during a live event, a selection of a point of interest (POI) in a media stream of the live event, the POI corresponding to a reference time during the live event, inserting into the media stream POI timing metadata indicating the reference time of the POI, and transcoding the media stream into data segments responsive to inserting the media stream POI timing metadata, each data segment corresponding to a presentation time stamp (PTS). The method may include selecting a data segment of the transcoded data segments, the selected data segment corresponding to a PTS mapped to the reference time and generating a media clip containing the selected data segment for presentation over a communications network during the live event.

18 Claims, 15 Drawing Sheets

Figure 1:
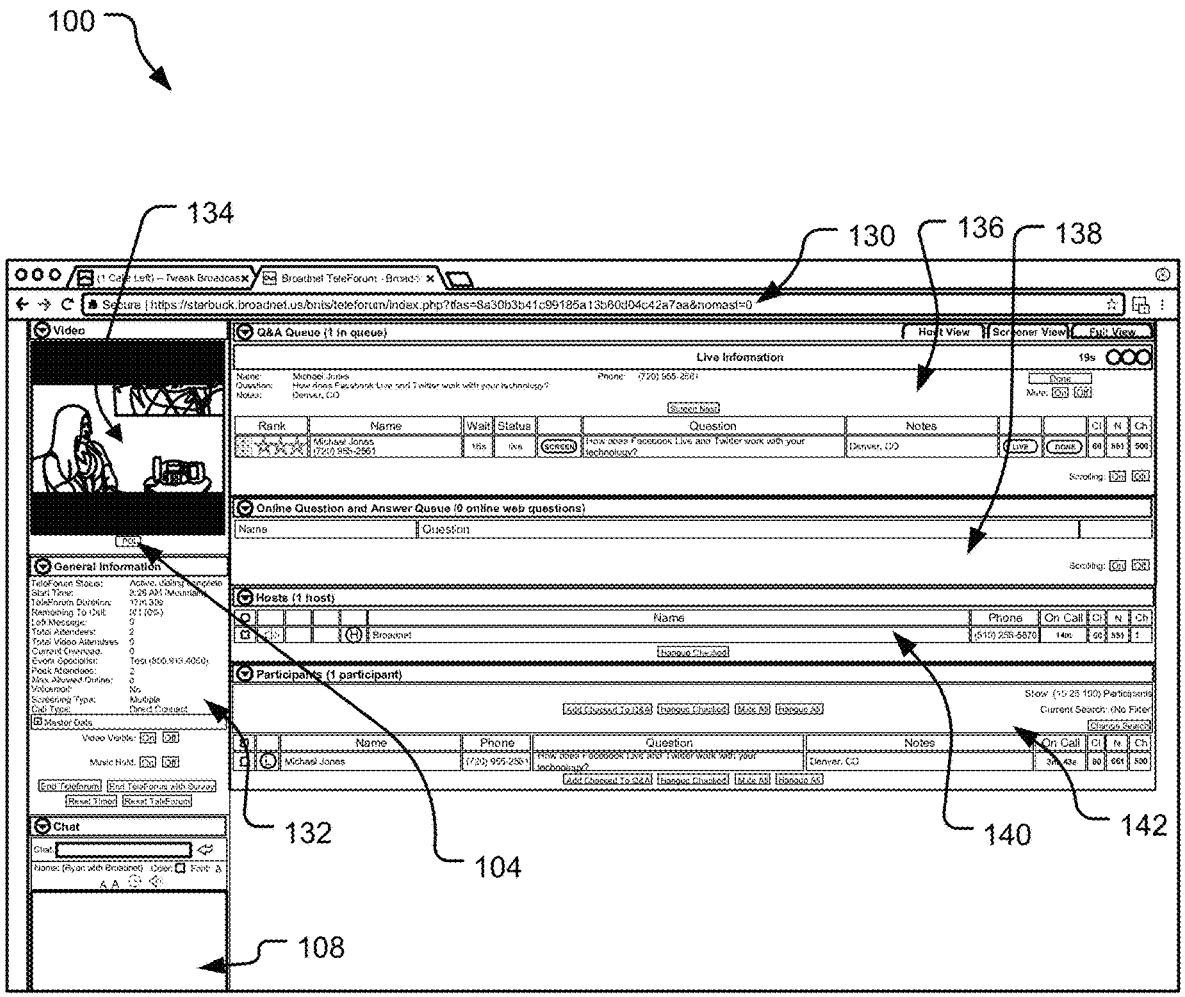

(51) Int. Cl.
    *H04N 21/4788*     (2011.01)
    *H04N 21/2187*     (2011.01)
    *H04N 21/8549*     (2011.01)
    *H04N 21/2743*     (2011.01)
    *G11B 27/10*     (2006.01)
    *H04N 21/2343*     (2011.01)

(52) U.S. Cl.
    CPC . *H04N 21/440218* (2013.01); *H04N 21/4788* (2013.01); *H04N 21/8549* (2013.01); *H04N 21/8586* (2013.01)

(56) References Cited

U.S. PATENT DOCUMENTS

| | | | |
|---|---|---|---|
| 2006/0064716 A1* | 3/2006 | Sull | G11B 27/105 |
| | | | 725/37 |
| 2012/0026327 A1* | 2/2012 | Jackson | H04N 21/4223 |
| | | | 348/143 |
| 2015/0074700 A1* | 3/2015 | Danovitz | H04N 21/4826 |
| | | | 725/14 |
| 2018/0020243 A1* | 1/2018 | Ni | H04N 21/2187 |

\* cited by examiner

FIG. 11

MEDIA CLIPPER SYSTEM

CROSS-REFERENCE TO RELATED APPLICATIONS

The present application is a non-provisional application which claims the benefit of priority to U.S. Provisional Patent Application No. 62/504,906, entitled "Media Clipper System" filed on May 11, 2017, which is specifically incorporated by reference herein for all that it discloses or teaches.

BACKGROUND

Live video streaming events are an efficient way for users to reach out to, communicate with, engage with and gather feedback from an audience about important issues, programs, and breaking news. During live video streaming events, users can be connected to constituents, members, and fans, solicit feedback, and hold live polls. Live video streaming events can be held anywhere and be viewed by an audience located elsewhere accessible by a variety of mediums, including phone, audio and video streaming, and social media platforms.

SUMMARY

Implementations disclosed herein provide a media clipper system that pushes select content from a live event to social media and to an audience during the live event. Specifically, the disclosed technology includes a system and method for selecting a highlight media clip from a video or audio stream by marking a "point of interest" (POI), using the POI to navigate a media file for editing, and posting the highlight media clip to social media platforms in near real-time.

In one implementation, a method includes receiving, during a live event, a selection of a POI in a media stream of the live event, the POI corresponding to a reference time during the live event, inserting into the media stream POI timing metadata indicating the reference time of the POI, and transcoding the media stream into data segments responsive to inserting the media stream POI timing metadata, each data segment corresponding to a presentation time stamp (PTS). The method may further include selecting a data segment of the transcoded data segments, the selected data segment corresponding to a PTS mapped to the reference time and generating a media clip containing the selected data segment for presentation over a communications network during the live event.

This Summary introduces a selection of concepts in a simplified form that are further described below in the Detailed Description. This Summary is not intended to identify key features or essential features of the claimed subject matter, nor is it intended to be used to limit the scope of the claimed subject matter. Other feature, details, utilities, and advantages of the claimed subject matter will be apparent from the following more particular Detailed Description of various implementations as further illustrated in the accompanying drawings and defined in the appended claims.

BRIEF DESCRIPTIONS OF THE DRAWINGS

Figure 2:
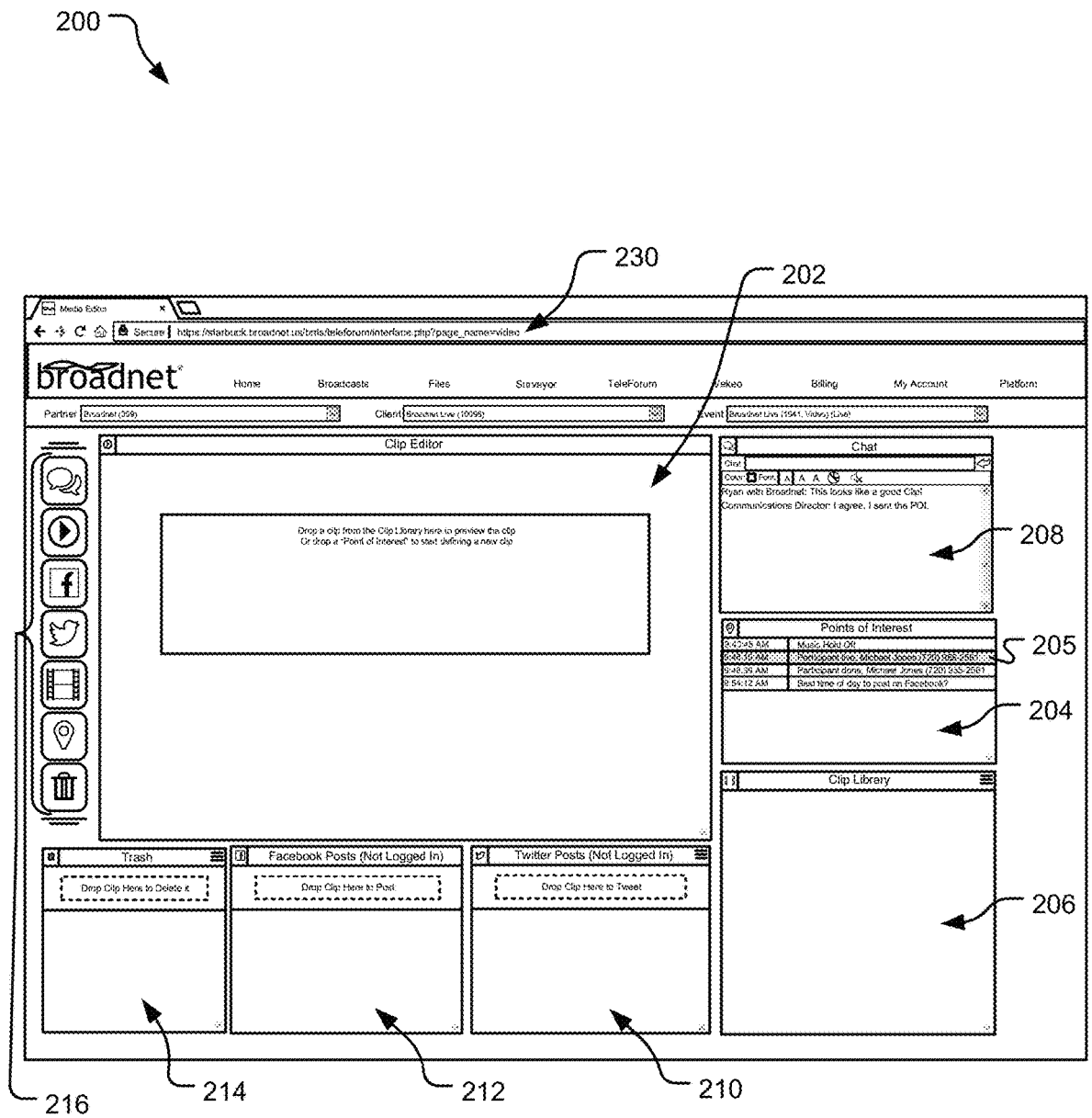
Figure 3:
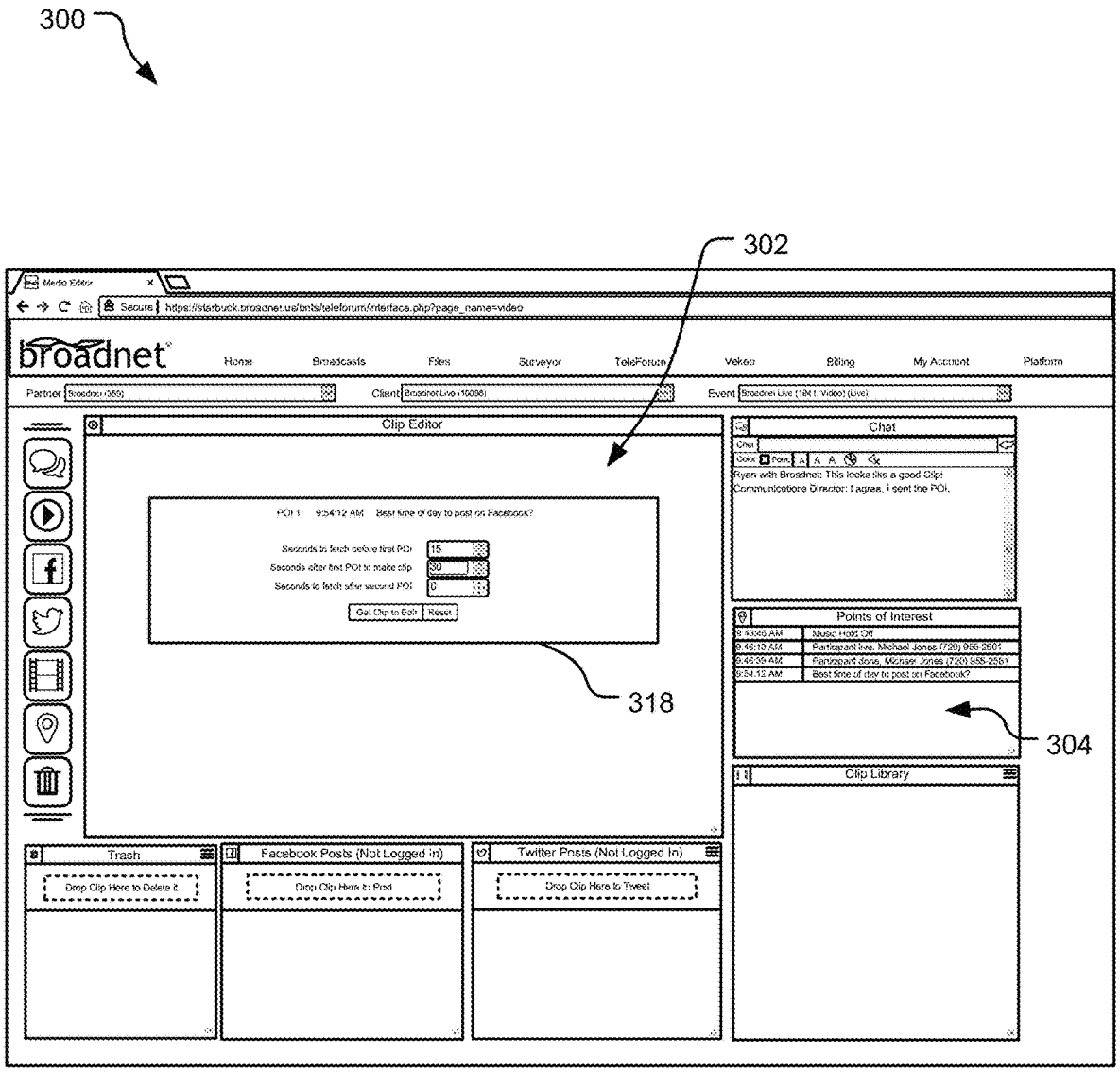
Figure 4:
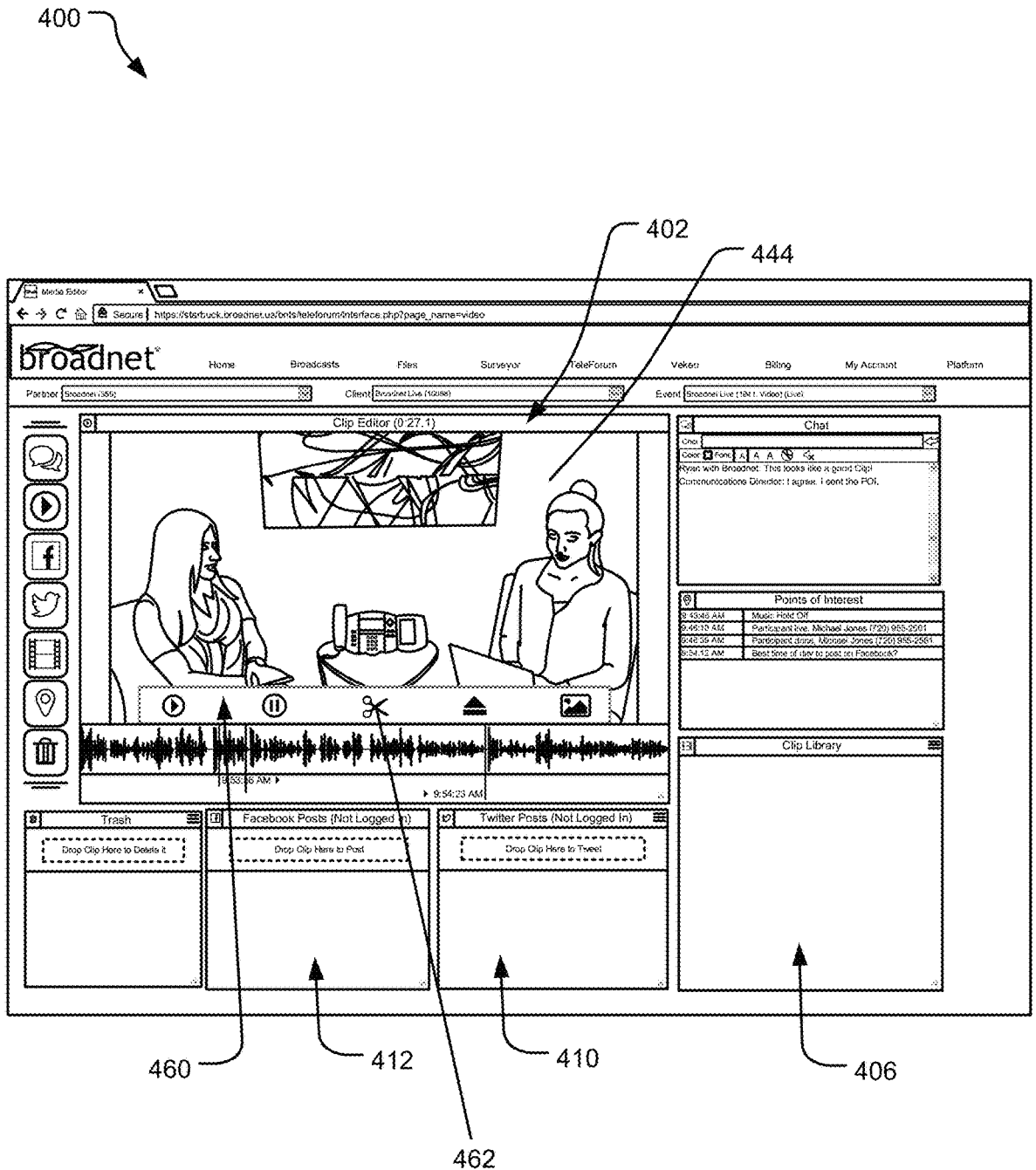
Figure 5:
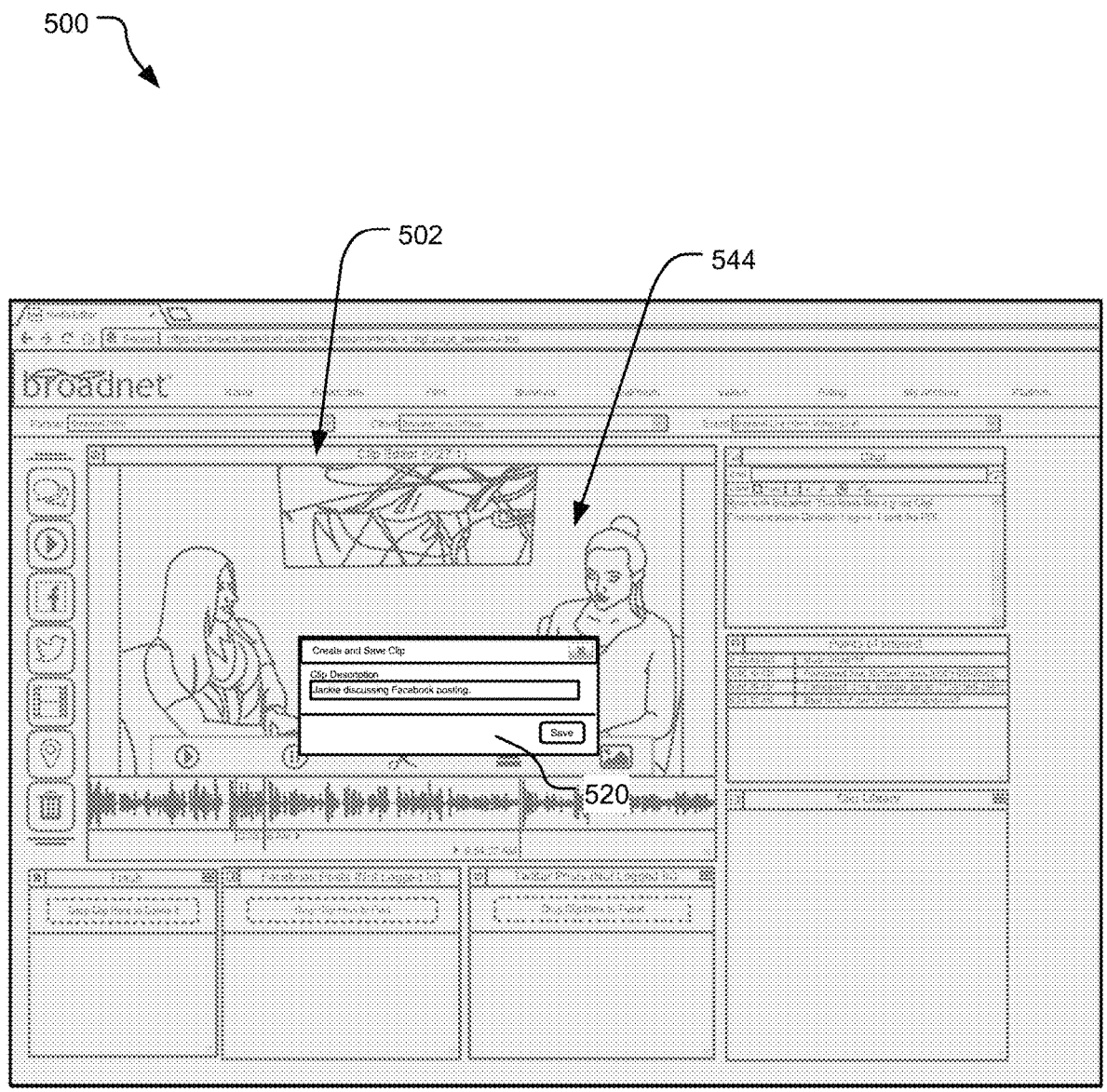
Figure 6:
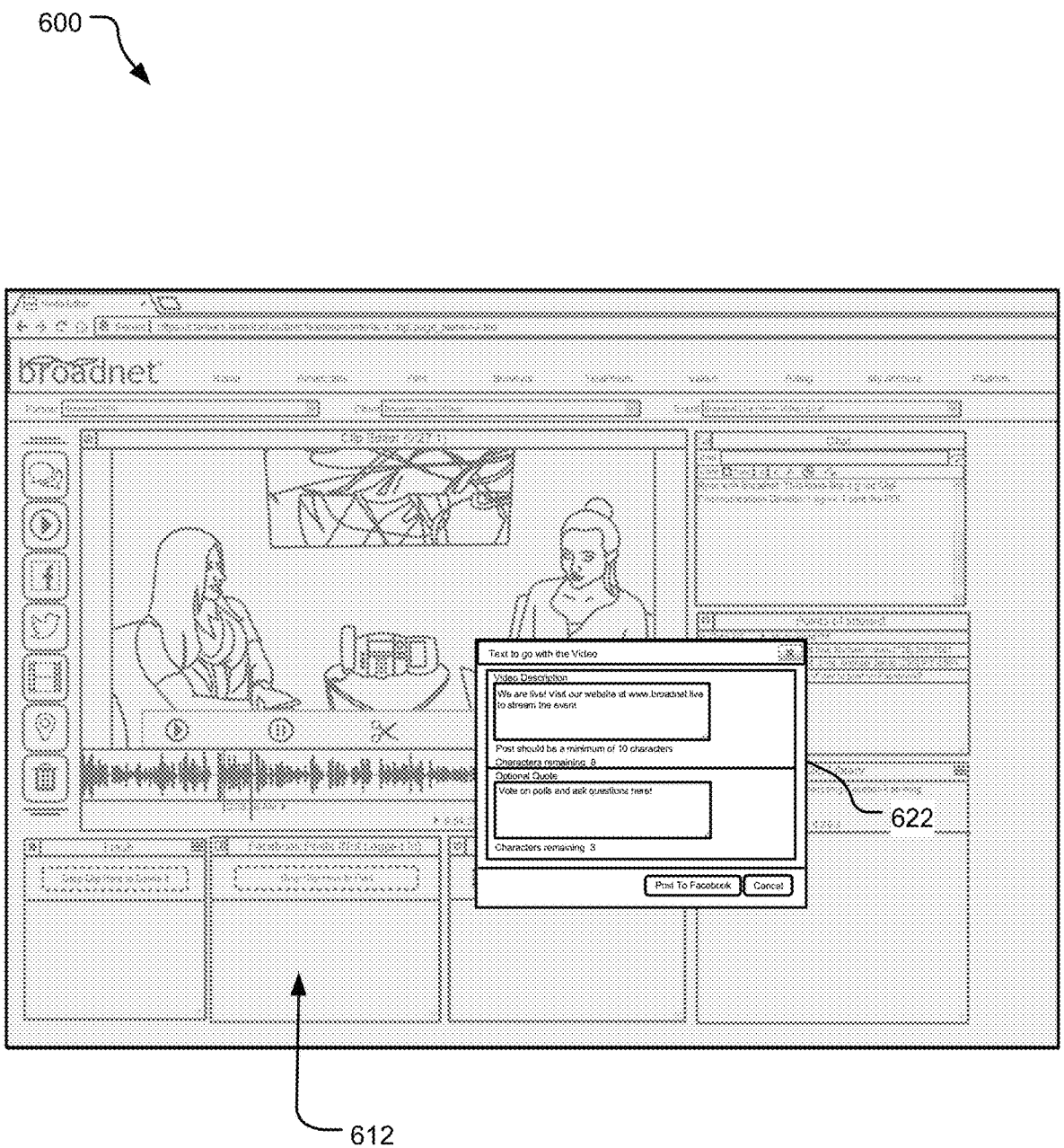
Figure 7:
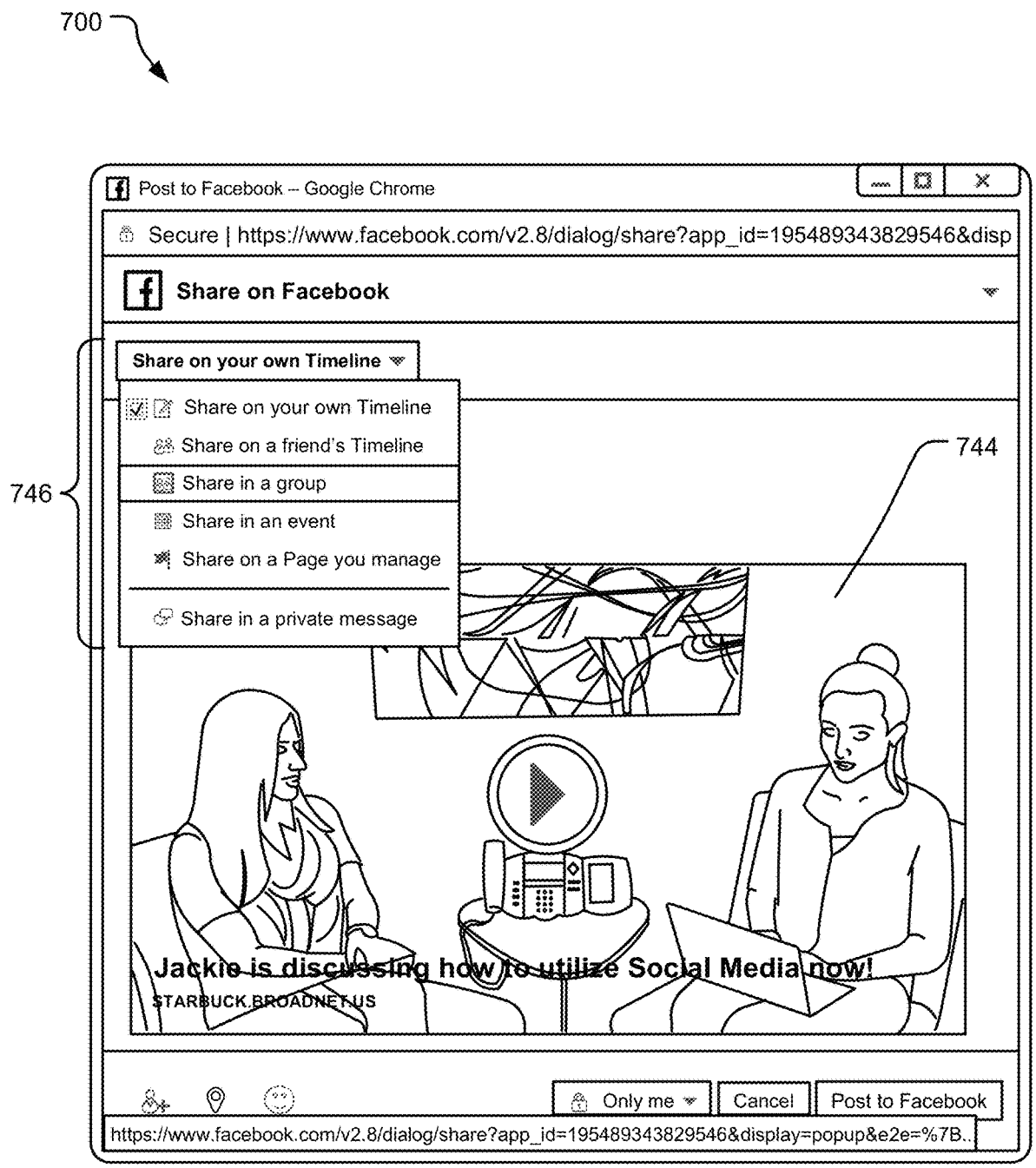
Figure 8:
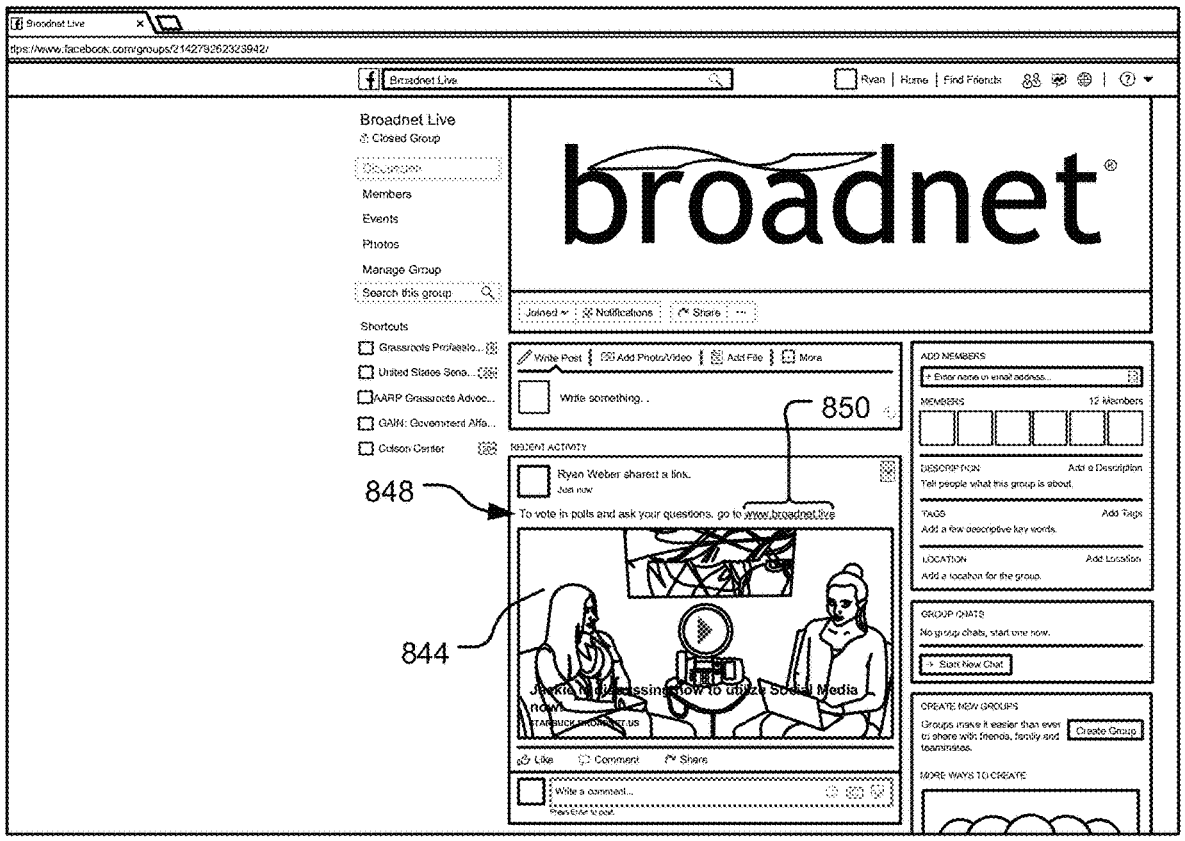
Figure 9:
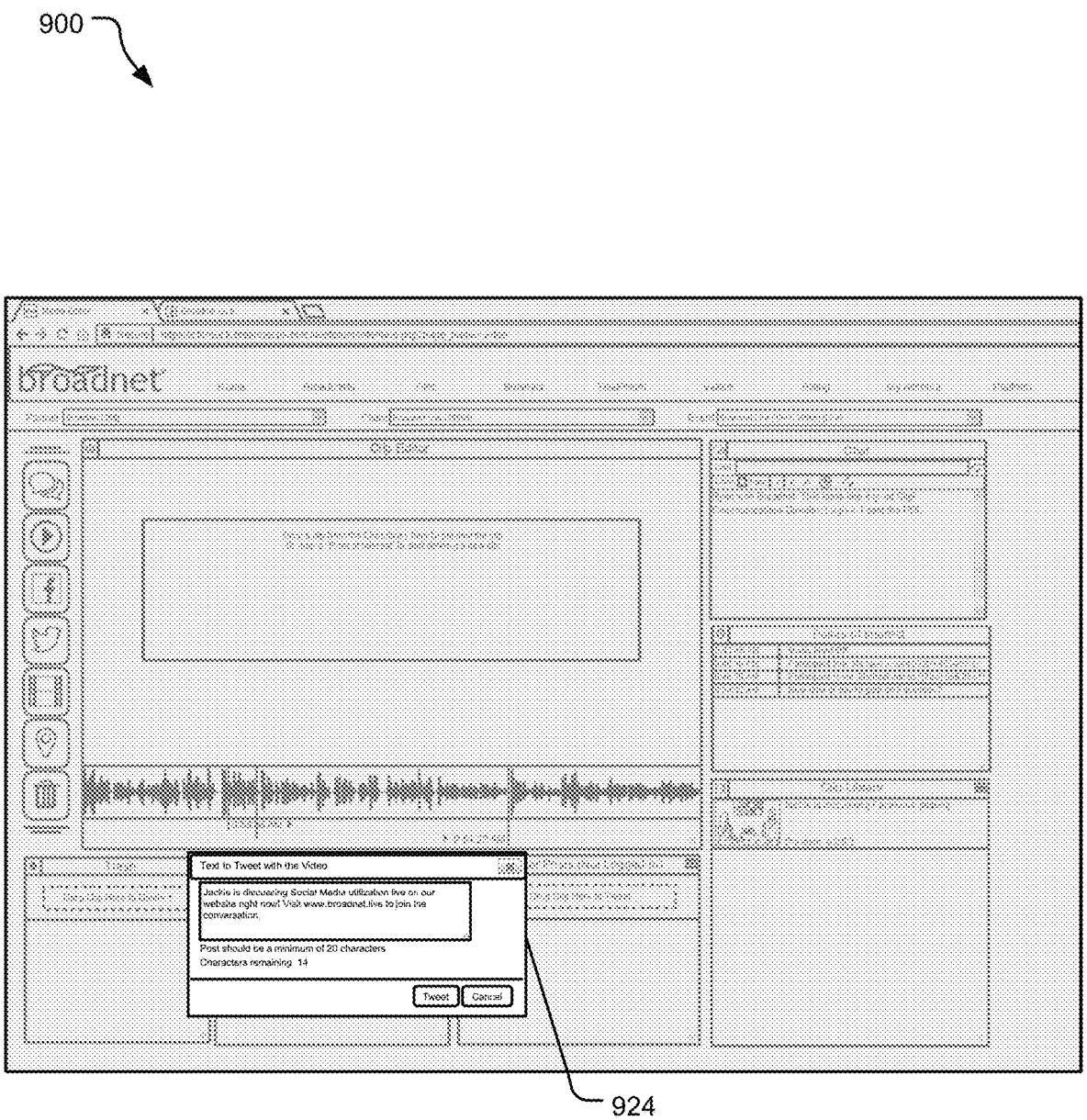
Figure 10:
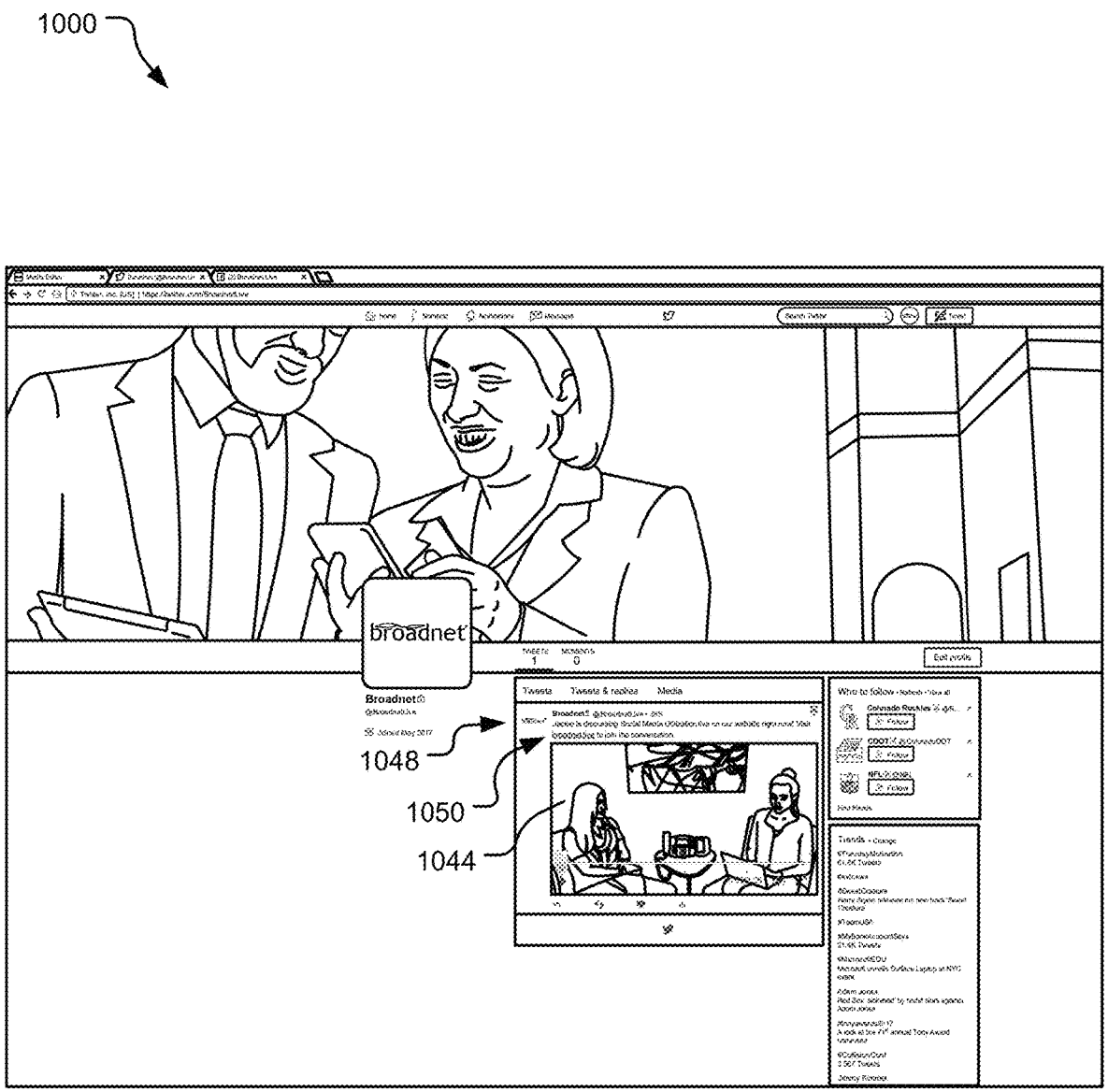
Figure 12:
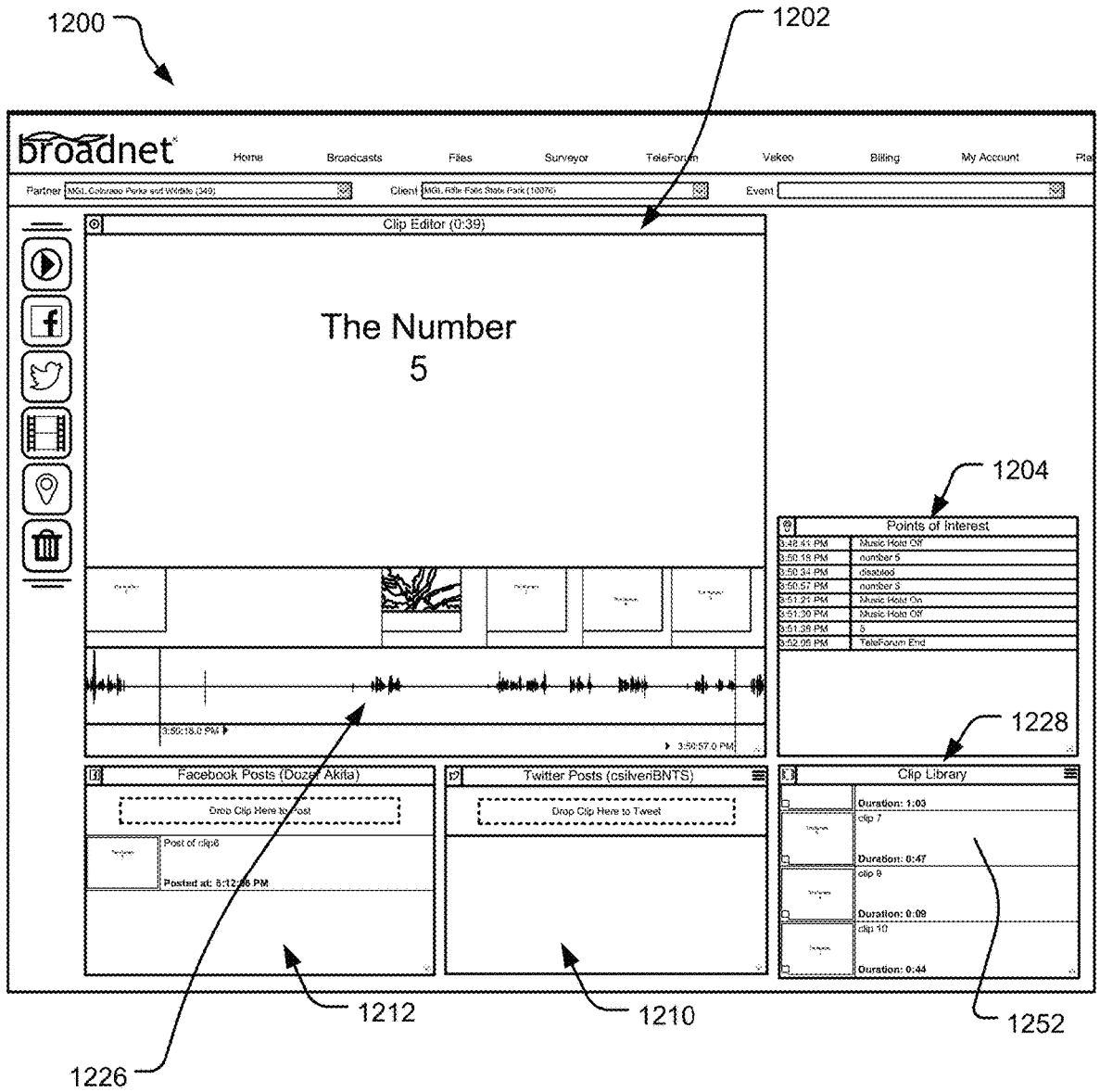
Figure 13:
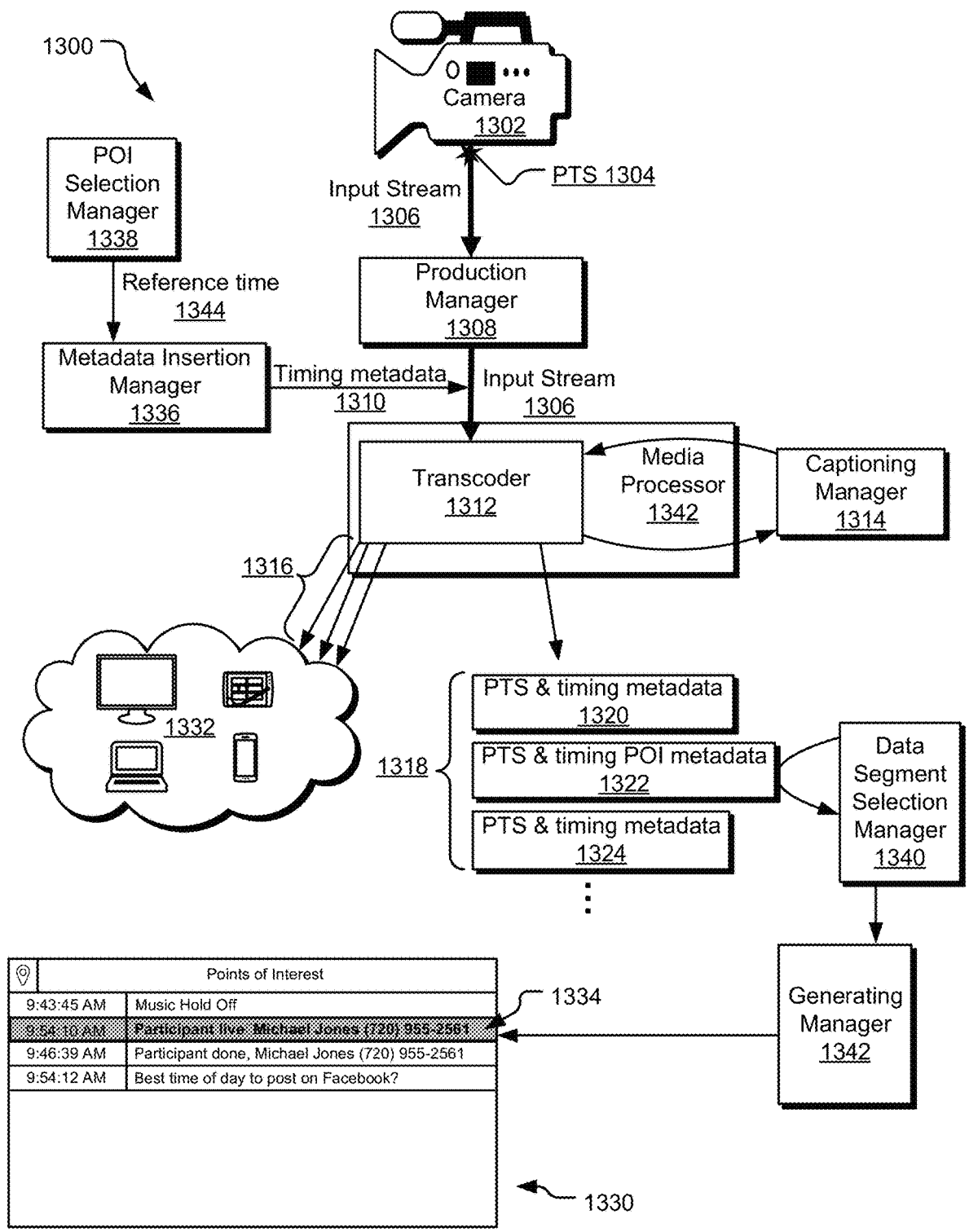
Figure 14:
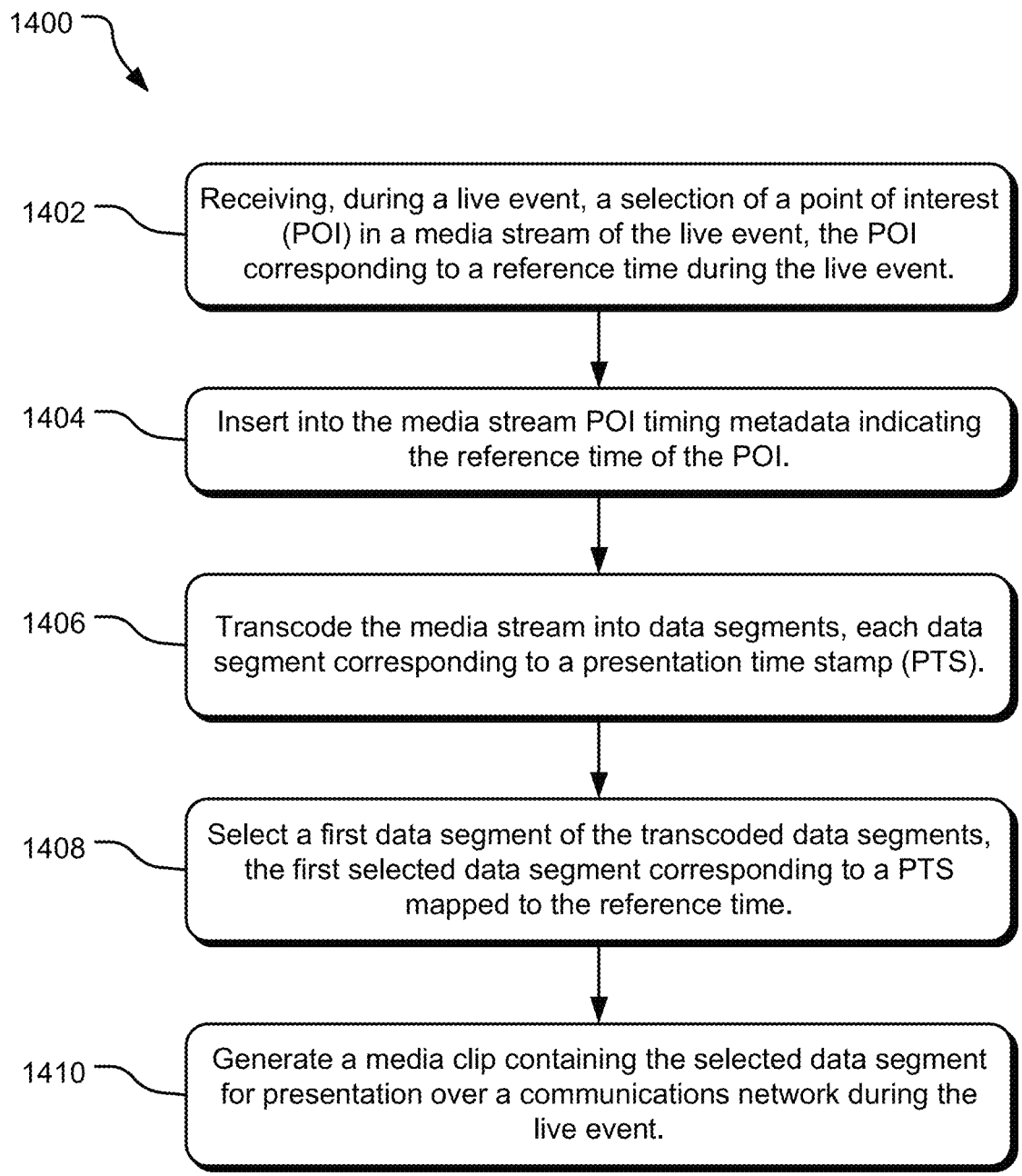
Figure 15:
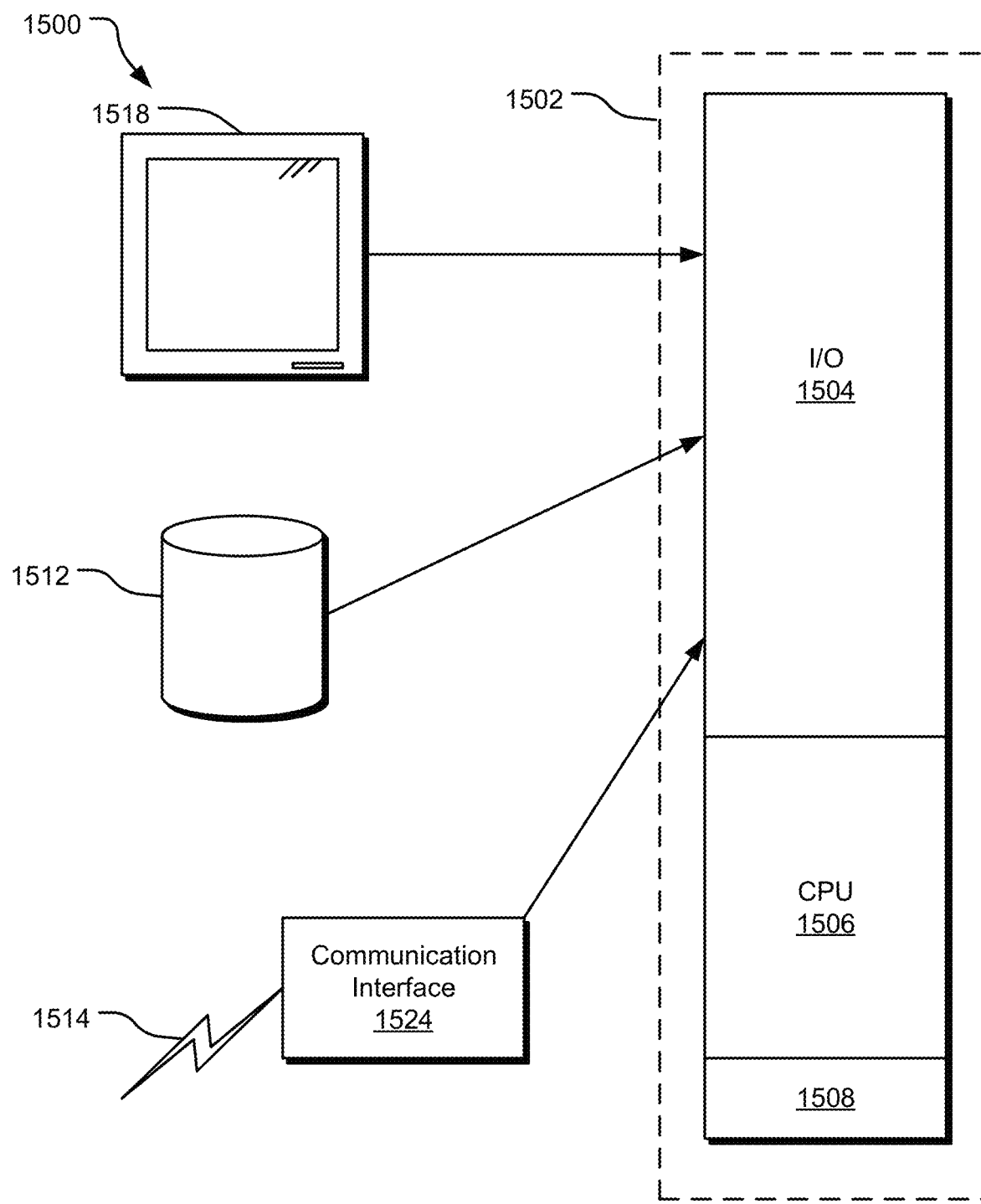

FIG. 1 illustrates an example screenshot of the media clipper system.
FIG. 2 illustrates an example screenshot of the media clipper system.
FIG. 3 illustrates an example screenshot of the media clipper system.
FIG. 4 illustrates an example screenshot of the media clipper system.
FIG. 5 illustrates an example screenshot of the media clipper system.
FIG. 6 illustrates an example screenshot of the media clipper system.
FIG. 7 illustrates an example screenshot of the media clipper system.
FIG. 8 illustrates an example screenshot of the media clipper system.
FIG. 9 illustrates an example screenshot of the media clipper system.
FIG. 10 illustrates an example screenshot of the media clipper system.
FIG. 11 illustrates an example screenshot of the media clipper system.
FIG. 12 illustrates an example screenshot of the media clipper system.
FIG. 13 is a flowchart of example operations of using a media clipper system.
FIG. 14 is a schematic diagram of a media clipper system.
FIG. 15 illustrates a block diagram of a computer system in a media clipper system.

DETAILED DESCRIPTION

News organizations and journalists are in a perpetual race to report breaking news and highlights of events. Live events, such as forums, meetings, town halls, and sporting events, are recorded and select media clips from the live events are replayed on television, social media platforms, and websites after the live events occur.

The disclosed technology includes selecting media clips from a video or audio recording in a live event and posting the media clips to social media platforms in near real-time during the live event. For example, a live event may be audio streamed or video streamed. As the live streaming event occurs, a user of the disclosed media clipper system may identify a significant occurrence, such as a highlight, statement, or soundbite that the user wishes to isolate into a select media clip for transfer to another platform (e.g., social media or a website) or for other purposes (e.g., saving in a media library).

In the disclosed media clipper system, a user can select a point of interest (POI) in the media at or near where the identified highlight, statement, or soundbite occurs by marking. Marking may be accomplished by a user manually using a computer cursor to click on a POI tab or button when the user hears a desired segment of the media file. In such instance, the POI may be marked after the highlight, statement, or soundbite occurs, accounting for the time it takes a user to identify the highlight, statement, or soundbite and manually hit the POI tab. In some implementations, a POI can be automatically generated. For example, audio recognition software can mark a POI when certain words are spoken.

Once a POI is marked, a candidate clip is created from a processed media file and the candidate clip is displayed in a POI window in the media clipper system. The start and end points of the candidate clip may be fine-tuned in an editing operation in the media clipper system. The candidate clip may be edited to include at least one desired segment in a clip editor window to create a finished clip. For example, a POI in the media file may be marked and narrowly edited to only include the exact desired segment with a clip editor. In another example, editing may capture the POI and a certain period of time before and/or after the desired segment.

In some implementations, the media file may be selected based on a calculating the POI with a delay. For example, a delay may be the time it took a user to mark the POI after the desired segment occurred in the recording. In another example, the delay may be the time it takes for media stream producing, captioning, processing, encoding/transcoding operations, or any combination of these operations, to occur. Such delays could take 10, 20, or 30 seconds, for example.

In some implementations, text of the audio in the video may be incorporated into the media clipper system (e.g., captioning). In some implementations, the text may be used to help edit the video clip to a desired segment. In some implementations, there may be a search function to search the text for specific buzz words or soundbites.

In some implementations, a frame of the video may be selected in the candidate clip to use as a poster image in a social media post accompanying the candidate (or video) clip. In some implementations, additional annotations, text, or graphics may be added to the poster image.

After the candidate clip is edited, the candidate clip may be saved in a clip library as a finished clip. In some implementations, a global clip library may include finished clips from other streaming events or sources. Content may be combined from different media clips in the global clip library. The finished clip may be viewed in a preview setting.

In some implementations, the finished clip may be shared outside the media clipper system. For example, the finished clip may be dragged from the clip library into a window for uploading to a social media site (e.g., Facebook, Twitter, etc.). Once the finished clip is dragged into the social media window, a description may be typed to accompany the finished clip in a social media post. The description may include a link to a website to redirect a social media user back to the event host's website, a live streaming event, or other location. As a result of the disclosed technology, social media ready media clips may be created in near real-time and made available for immediate posting.

Use of the disclosed technology may be implemented in various examples of live events. For example, the live event may be a live video streaming event, such as a teleforum. For purposes of this disclosure, a teleforum may include generating simultaneous outbound invitation calls to multiple invitees and transmitting a message to each invitee, inviting him or her to become an active teleforum participant. Active teleforum participation may include, but is not limited to, speaking to the teleforum, asking a question, or providing information.

For example, a participant may call into a telephone conference and participate in an interview with a screener. The screener may give the participant a ranking based on their interview. If the participant is made "live" to participate in the event's streamed content, a POI may automatically be initiated corresponding to their ranking. An additional POI may be initiated when the participant is removed from further participation in the event's streaming content. In some implementations, there may be automated POI marking with tags. For example, automated POI marking may occur with text-recognition in the case of a slide deck (e.g., when the words "pre-existing conditions" or "government spending" are typed) or audio/voice recognition in the case of an audio or video file (e.g., when a user says "pre-existing conditions" or "government spending").

In another example, the live event may be a sporting event. Media clips of game highlights may be selected while they are happening to provide play by play moments immediately to fans.

FIG. 1 illustrates an example screenshot 100 of a media clipper system from an event staff member's interface during a teleforum. The screenshot 100 shows various components of a media clipper system accessed via a website address 130 by an event staff member during the teleforum. In some implementations, the media clipper system may be used for a live streaming event.

A host window 140 displays the name of the host and other identifying information. A participant's window 142 displays the name of the participants and other identifying information. For participants to ask questions, there may be Question and Answer (Q&A) queue windows as they await screening and an opportunity to ask their questions (e.g., Q&A Queue window 136 and Online Q&A Queue window 138). The media clipper system may include other features, such as a media window (e.g., video window 134) and a general information window 132. The media clipper system may also include a chat window 108 where users of the media clipper system can communicate with one another. There may be multiple users using the media clipper system at the same time. In the clip library, video clips may be deleted, downloaded, and dragged to social media windows.

During the live event, the event staff member can mark a POI in a media stream by clicking or pressing the POI button 104. For example, when an event staff member hears a highlight, statement, or soundbite of interest, or wants to mark a specific participant's video clip, the event staff member can mark the POI to create a candidate clip. In some implementations, the POI may be automatically marked. The POI corresponds to a reference time (e.g., the "clock on the wall" time when a user hits the POI button immediately after the user hears the soundbite) during the live event.

When the POI is selected (automatically or manually), POI timing metadata that indicates the reference time of the POI may be inserted into the media stream. The media stream may be transcoded into data segments responsive to inserting POI timing metadata into the media stream. Each data segment corresponds to a presentation time stamp (PTS), a timestamp metadata field, when the media stream starts as a "time zero."

Specific data segments of the transcoded data may be selected. For example, a first data segment corresponding to a PTS mapped to the reference time may be selected, as well as a second data segment before the first data segment and a third data segment after the first data segment to ensure that a soundbite or other highlight near the POI is captured, or to obtain additional media clips around the POI that may be of interest.

A candidate clip that contains the selected data segment(s) may be generated and displayed in a POI window in the media clipper system for editing (shown and described in more detail in FIG. 2). The candidate clip may be edited by a clip editor to narrow the desired highlight or segment in a clip editor window. For example, a POI in a media file may be marked immediately after a participant makes comments of interest, and editing can capture the desired highlight or segment by narrowing the temporal end points of the candidate clip prior to the POI. In some implementations, the media file may be selected based on a calculation of the POI with a delay.

FIG. 2 illustrates an example screenshot 200 of the media clipper system. The screenshot 200 shows various components of a media clipper system accessed via a website address 230 by a user during an editing process. In some implementations, the user may be an event staff member. In some implementations, the user may be a third-party user (e.g., a broadcasting company).

After the user has created at least one POI in the stream while the stream (e.g., an audio or video stream of a live event) is being broadcasted and recorded (as described in FIG. 1), the at least one POI is saved in a media file 205 in a POI window (e.g., POI window 204) which becomes a candidate clip, which is a video or audio clip.

A user can drag any saved POI media file 205 from the POI window 204 to a clip editor window 202 to edit desired content in the candidate clip. Once the candidate clip is edited, the candidate clip may be saved as a finished clip, whereupon the finished clip will be available in a clip library 206. The finished clip may be viewed from the clip library 206, removed to a trash 214, or uploaded to a social media site. For example, a "Facebook Posts" window 212 and a "Twitter Posts" window 210 are shown in the screenshot 200.

The screenshot 200 also shows that the media clipper system may have icons 216 of shortcuts to different functions, operations, applications, or widgets. In some implementations, the media clipper may have a chat window (e.g., chat window 208) for users running the event, or other potential users of the media clipper system. There may be multiple users using the media clipper system at the same time.

FIG. 3 illustrates an example screenshot 300 of the media clipper system. The screenshot 300 shows that a user has selected a "POI 1" from a recorded video which is saved as a media file and displayed in a POI window 304 (see "9:54:12 AM Best time of day to post on Facebook?" in POI window 304). When the user selects the media file, a time window 318 pops up in a clip editor window 302, providing the ability to adjust the start and end times of the media file in a candidate clip. For example, a user can adjust the seconds to fetch before a first POI, the seconds after the first POI to make a candidate clip, and the seconds to fetch after a second POI and click on a "Get Clip to Edit" button to retrieve a candidate clip for further editing.

FIG. 4 illustrates an example screenshot 400 of the media clipper system. The screenshot 400 shows a candidate clip 444 that has been loaded in a clip editor window 402 in response to a user pressing the "Get Clip to Edit" button after adjusting the start and end times of a selected media file (as described in FIG. 3).

The clip editor window 402 may display a button 460 with icons (e.g., scissor icon 462) for playing, pausing, cutting, ejecting, or other editing operations. For example, a scissor icon 462 may be selected for a "cutting" operation. If the cutting operation is selected, the temporal ends points (e.g., start and end points) of the candidate clip 444 can be adjusted in the clip editor window 402. In some implementations, additional editing functions can occur.

In some implementations, a frame from the candidate clip 444 may be selected for use as a poster image (not shown) in the clip library 406 and in a social media post (e.g., uploaded via the "Facebook Posts" window 412 or a "Twitter Posts" window 410).

FIG. 5 illustrates an example screenshot 500 of the media clipper system. After a candidate clip 544 has been edited in the clip editor window 502, the clip editor window 502 may display a clip description window (e.g., a clip description window 520), which allows a user to type in a description or text of the candidate clip and save the description or text. When the candidate clip has been edited and saved, the media clip is a "finished" clip.

FIG. 6 illustrates an example screenshot 600 of the media clipper system. When a user wants to upload the finished clip to a social media site, the user can drag the finished clip to a social media window (e.g., Facebook window 612). Once the finished clip is dropped into the social media window, a description window (e.g., Facebook description window 622) displays and allows a user to type in a description or text of the video clip and an optional quote to accompany the finished clip in a social media post. A user can press a "Post to Facebook" button or a "Cancel" button. If the user presses the "Post to Facebook" button, communications are made to Facebook's API and the finished clip is posted to Facebook. In other implementations, the user may post the video clip to other social media sites.

Once the Facebook API is invoked, a pop-up window for Facebook appears, as shown in the example screenshot 700 of the media clipper system in FIG. 7. In FIG. 7, example operations 746 are shown for where a user shares the video clip 744 on their timeline (e.g., "Share on your own Timeline," "Share on a friend's Timeline," "Share in a group," etc.) in the Facebook application. In other implementations, the user may post and share the video clip 744 via other operations, and in other social media sites. Other methods of uploading the disclosed finished clips to social media or other communication networks are contemplated.

In FIG. 7, a Facebook Share application is shown by way of example for illustrative purposes. Other applications are contemplated. For example, the operations 700 may be used in a Facebook Post application, or other shared link, post, etc.

FIG. 8 illustrates an example screenshot 800 of the media clipper system. The screenshot 800 shows a video clip 844 posted in the Facebook application with text 848 entered in the media clipper system. The text 848 entered in screenshot 800 includes a website link 850. In some implementations, the website link 850 can link a user back to a live streaming event, to a website of a source of a streaming event, or to another web address.

In FIG. 8, a Facebook Share application is shown by way of example for illustrative purposes. Other applications are contemplated. For example, the operations 800 may be used in a Facebook Post application, or other shared link, post, etc.

FIG. 9 illustrates an example screenshot 900 of the media clipper system. The screenshot 900 shows a Tweet description window 924 that pops up when a user initiates a Twitter post by dragging and dropping a video clip to the Twitter window (shown, for example, as Twitter window 210). The Tweet description window 924 allows a user to type in in a description or text to accompany the video clip, and to call Twitter's API and tweet the video clip and tweet to Twitter. In other implementations, the user may post the video clip to other social media sites.

FIG. 10 illustrates an example screenshot 1000 of the media clipper system. The screenshot 1000 shows a video clip 1044 posted in the Twitter application with text 1048 that was entered in the media clipper system. The text entered in screenshot 800 includes a website link 1050. In some implementations, the website link 1050 can link a user back to a live streaming event, to the website of a source of a streaming event, or to another web address.

FIG. 11 illustrates an example screenshot 1100 of the media clipper system. The screenshot 1100 shows a website page from which a user would be directed if the user clicked on a link (e.g., a website link 850 as shown in FIG. 8 or a website link 1050 shown in FIG. 10) in a social media post with the video clip. In some implementations, the website may be the source of the video clip. In some implementations, the website may be another source of information, for example, a congressman's website if the video clip is from the congressman's streaming event.

FIG. 12 illustrates an example screenshot 1200 of the media clipper system. The screenshot 1200 shows the media clipper system for obtaining a video clip from an audio stream with an optional slide deck (e.g. PowerPoint). In some implementations, an audio stream is recorded, and a POI may be selected. The POI will appear in a POI window 1204. Content in the audio stream may be edited to create a video clip 1252 by dragging the POI from the POI window 1204 into the clip editor 1202. The POI appears in the clip editor 1202 as an audio waveform 1226. A timeline with identified end points on the audio waveform 1226 is shown. Slide thumbnail images appear on the timeline.

The video clip 1252 may be saved in a clip library 1228. The video clip 1252 may be uploaded from the clip library to a social media site (e.g., Facebook, Twitter, etc.) by dragging the video clip 1252 from the clip library into a social media window (e.g., a Facebook window, a Twitter window, etc.).

FIG. 13 is a schematic diagram 1300 of a media clipper system. Specifically, the schematic diagram 1300 shows the processing of a media stream in the disclosed technology. A POI is selected or marked either by a user or automatically at a reference time 1344 with a POI selection manager 1338. For example, in a teleforum, a POI may be marked when a participant named Michael Jones "goes live" and starts speaking at 9:54:10. The reference time 1344 may be the "clock on the wall" time or real-time that the POI is selected (e.g., when a user hit a POI button or when a participant goes live). When the POI is marked, text identifying the selected POI is saved to a table or window (e.g., "9:54:10 AM Participant live, Michael Jones (720) 955-2561" in POI table 1330). The text may be automatically entered in the table. After processing the media stream, a user can click on the text and open a media file that includes the POI (described below).

Initially, the text identifying the POI shows up in a light gray color in the table to indicate the POI is marked and undergoing processing (see media file 205 in FIG. 2). When the text is in light gray, the table does not yet include a recording file. In other implementations, other indicators may communicate the availability of the POI (e.g., text stating the media file is not available for preview). Once the POI is processed, the POI shows up in a dark gray color in the table to indicate the POI is done processing and a media file is available for viewing and editing (shown in media file 1334).

During streaming, camera input of media files from a camera 1302 is sent in an input stream 1306 to a production manager 1308 for a production operation (e.g., vMix production software). A PTS 1304, a timestamp metadata field, marks when the stream starts as a "time zero."

After the input stream 1306 undergoes a production operation, information may be added to the stream. For example, referring to FIG. 13, the POI selection manager 1338 provides the reference time 1344 corresponding to the POI to the metadata insertion manager 1336. The metadata insertion manager 1336 inserts the timing metadata 1310, including the reference time 1344, into the input stream 1306. In some implementations, the timing metadata 1310 can correspond to a variety of time specific events (e.g., the time of a selected POI in "clock on the wall" time, the time the video is turned off, etc.). In FIG. 13, the metadata insertion manager 1336 inserts timing metadata 1310 indicating the reference time of the POI into the input stream 1306 after the POI selection manager 1338 has selected the POI.

The input stream 1306 may be processed in a media processor 1342. In some implementations, the media processor 1342 may include a transcoder 1312, which can transrate and transcode the input stream 1306 in a streaming application (e.g., a Wowza streaming application). For purposes of this disclosure, transcoding operations may include transcoding and transrating operations, and a transcoder may include a transcoder and a transrater. Other components and methods for processing the input stream 1306 are contemplated.

In some implementations, during processing, the input stream 1306 may be diverted from the transcoder 1312 to a captioning manager 1314, where captioning is injected into the video stream in a captioning operation. The captioning operation may occur automatically and may cause a delay (e.g., 30 seconds).

In one implementation, when the input stream 1306 is transrated by the transcoder 1312, the bitrate of the video or audio source is changed via an encoder and converted into one or more lower-bitrate streams to enable adaptive bitrate streaming. For example, the transcoder 1312 may output three streams 1316 (e.g., a data stream, an audio stream, and a video stream) to a communications network 1332. In one implementation, output of the three streams 1316 may be transferred to a participant on a web browser with captions (if a captioning operation was performed).

During processing, the same input stream 1306 may also be pulled for a media file. The input stream 1306 may be transcoded by the transcoder 1312, where one analog-to-analog or digital-to-digital file is converted to another file format. For example, the input stream 1306 may be transcoded for packetizing data from the entire live event in a plurality of data segments 1318 (e.g., 300 or 400 ten second data chunks) into disk. In one implementation, HTTP Live Streaming (HLS) technology may be used to transcode the input stream 1306.

Each of the data segments 1318 include timing metadata (e.g., reference time of a POI) from the inserted time signals and a PTS. The timing metadata and the PTS can be mapped to each other by a data segment selection manager 1340 to determine a reference time corresponding to a desired POI. Thus, a correlation can be made between the timing metadata and the PTS in each data segment to select which data segment may be used for a candidate clip by the data segment selection manager 1340. For example, if a requested POI was marked for 2:05:10 real-time as the reference time 1344, and a PTS is 2:05:20, a data segment corresponding to 2:05:10 can be determined by calculating an off-set of time. A check can be performed by verifying the PTS in a specific data segment. Specifically, verification can be made from the PTS (when the stream starts at zero) and the timing metadata to check the system's overall clock reference (e.g., clock on the wall time) in selection of a data segment with a desired POI.

In some implementations, delays may be calculated to provide for adjustment of the time and a corresponding data segment. In some implementations, a standard amount of delay may be incorporated for a specific operation, such as production or processing software. For example, if captioning resulted in a 30 second delay in the streaming process, a time adjustment may be made to determine a specific data segment (with time signaling metadata including 2:04:30) to use for a candidate clip based on POI (2:05:00) minus the delay (e.g., 30 seconds). Delays may also be incurred during other production, processing, encoding, and streaming operations and included in the time calculation.

Referring to FIG. 13, the data segment selection manager 1340 selects a first data segment 1322, which includes a PTS and the POI timing metadata corresponding to a selected POI. After the selected first data segment 1322 is verified by the data segment selection manager 1340, a generating manager 1342 generates a media file 1344 for a candidate media clip containing the first data segment 1322 for presentation over a communications network during the live event.

In addition to selecting the data segment with the POI, other specific data segments of the transcoded data may be selected for a media file. For example, a first data segment (e.g., a first data segment 1322) corresponding to a PTS mapped to the reference time may be selected, as well as a second data segment (e.g., a first data segment 1320) before the first data segment and a third data segment (e.g., a first data segment 1324) after the first data segment to ensure that a soundbite or other highlight near the POI is captured, or to obtain additional media clips around the POI that may be of interest.

The media file 1344 with the first data segment 1322 is transmitted by the generating manager 1342 into the POI table 1330 (see media file 1334, represented by the text "9:54:10 AM Participant live, Michael Jones (720) 955-2561"). The availability of the media file is communicated. For example, text for the POI appears in a darker color indicating accessibility to a candidate clip (see media file 1334 in FIG. 13). A user can click on the text referencing the POI or a play button for the POI for editing the candidate clip (e.g., 30-60 seconds after the user initially pressed the POI button). As the marking of a POI may occur after the actual soundbite or highlight occurs, the end points of the candidate clip may be adjusted accordingly in order to narrow the candidate clip to a desired media segment.

FIG. 14 is a flowchart of example operations 1400 of using a media clipper system. An operation 1402 receives, during a live event, a selection of a POI in a media stream of the live event. The POI corresponds to a reference time (e.g., the "clock on the wall" time when a POI is marked) during the live event.

An operation 1404 inserts POI timing metadata corresponding to a time specific event into the input stream. For example, timing metadata may be inserted into the input stream indicating the reference time of the POI, the time of a POI in "clock on the wall" time, the time the video is turned off, etc.).

An operation 1406 transcodes the input media stream into data segments responsive to inserting the media stream POI timing metadata. Each data segment corresponds to a PTS.

An operation 1408 selects a first data segment of the transcoded data segments, which corresponds to a PTS mapped to the reference time. In some implementations, additional data segments may also be selected. For example, a first data segment corresponding to a PTS mapped to the reference time may be selected, as well as a second data segment before the first data segment and a third data segment after the first data segment to ensure that a soundbite or other highlight near the POI is captured, or to obtain additional media clips around the POI that may be of interest.

An operation 1410 generates a media file containing the selected first data segment for presentation over a communications network during the live event. Specifically, the media file may be saved in a POI table, where it can be dragged into a clip editor window as a candidate clip, edited, saved into a finished clip, and then uploaded to a social media site during a live event.

Referring to FIG. 15, a block diagram of a computer system 1500 suitable for implementing one or more aspects of a media clipper system is shown. The computer system 1500 is capable of executing a computer program product embodied in a tangible computer-readable storage medium to execute a computer process. Data and program files may be input to the computer system 1500, which reads the files and executes the programs therein using one or more processors. Some of the elements of a computer system 1500 are shown in FIG. 15 wherein a processor 1502 is shown having an input/output (I/O) section 1504, a Central Processing Unit (CPU) 1506, and a memory section 1508. There may be one or more processors 1502, such that the processor 1502 of the computing system 1500 comprises a single CPU 1506, or a plurality of processing units. The processors may be single core or multi-core processors. The computing system 1500 may be a conventional computer, a distributed computer, or any other type of computer. The described technology is optionally implemented in software loaded in memory section 1508, a disc storage unit 1512, and/or communicated via a wired or wireless network link 1514 on a carrier signal (e.g., Ethernet, 3G wireless, 5G wireless, LTE (Long Term Evolution)) thereby transforming the computing system 1500 in FIG. 15 to a special purpose machine for implementing the described operations.

The I/O section 1504 may be connected to one or more user-interface devices (e.g., a keyboard, a touch-screen display unit 1518, etc.) or a disc storage unit 1512. Computer program products containing mechanisms to effectuate the systems and methods in accordance with the described technology may reside in the memory section 1508 or on the storage unit 1512 of such a system 1500.

A communication interface 1524 is capable of connecting the computer system 1500 to an enterprise network via the network link 1514, through which the computer system can receive instructions and data embodied in a carrier wave. When used in a local area networking (LAN) environment, the computing system 1500 is connected (by wired connection or wirelessly) to a local network through the communication interface 1524, which is one type of communications device. When used in a wide-area-networking (WAN) environment, the computing system 1500 typically includes a modem, a network adapter, or any other type of communications device for establishing communications over the wide area network. In a networked environment, program modules depicted relative to the computing system 1500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module and other modules may be embodied by instructions stored in memory section 1508 and/or the storage unit 1512 and executed by the processor 1502. Further, local computing systems, remote data sources and/or services, and other associated logic represent firmware, hardware, and/or software, which may be configured to assist in obtaining and processing media clips. A media clipper system may be implemented using a general purpose computer and specialized software (such as a server executing service software to a workstation or client), a special purpose computing system and specialized software (such as a mobile device or network appliance executing service software), or other computing configurations. In addition, clipper media parameters may be stored in the memory section 1508 and/or the storage unit 1512 and executed by the processor 1502.

The computer system 1500 may include a variety of tangible processor-readable storage media and intangible processor-readable communication signals. Tangible processor-readable storage can be embodied by any available media that can be accessed by the computer system 1500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computer system 1500. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A media clipping system comprising:
   one or more hardware processor units;
   a POI selection manager that executes on the one or more hardware processor units to select a point of interest (POI) in a media stream of a live event, the POI corresponding to a live event reference time during the live event;
   a metadata insertion manager that executes on the one or more hardware processor units to insert POI timing metadata into the media stream, the POI timing metadata containing the live event reference time of the selected POI;
   to receive the media stream containing the POI timing metadata and the live event reference time
   a transcoder that executes on the one or more hardware processor units to receive the media stream containing the POI timing metadata and the live event reference time, and to transcode the received media stream into data segments responsive to receiving the POI timing metadata in the media stream, each data segment corresponding to a presentation time stamp;
   a data segment selection manager that executes on the one or more hardware processor units to select a first data segment of transcoded data segments, the selected first data segment corresponding to a first presentation time stamp mapped to the live event reference time received in POI timing metadata of the media stream; and
   a generating manager that executes on the one or more hardware processor units to generate a candidate media clip containing the selected first data segment for presentation over a communications network during the live event.

2. The media clipping system of claim 1, further comprising:
   a clip library to store the candidate media clip; and
   a clip editor that executes on the one or more hardware processor units to edit the candidate media clip into a finished clip for upload to the communications network during the live event.

3. The media clipping system of claim 2, wherein the finished clip includes a poster image and a link redirecting a user back to the live event.

4. A method comprising:
   receiving, during a live event, a selection of a point of interest (POI) in a media stream of the live event, the POI corresponding to a live event reference time during the live event;
   inserting into the media stream POI timing metadata containing the live event reference time of the selected POI;
   receiving the media stream containing the POI timing metadata and the live event reference time into a transcoder;
   transcoding, by the transcoder, the received media stream into data segments responsive to receiving the POI timing metadata in the media stream, each data segment corresponding to a presentation time stamp,
   selecting a first data segment of transcoded data segments, the selected first data segment corresponding to the presentation time stamp mapped to the live event reference time received in POI timing metadata of the media stream; and
   generating a media clip containing the selected first data segment for presentation over a communications network during the live event.

5. The method of claim 4, further comprising:
   selecting a second data segment of the transcoded data segments, the selected second data segment occurring before the first data segment; and selecting a third data segment of the transcoded data segments, the selected third data segment occurring after the first data segment.

6. The method of claim 4, further comprising:
creating a candidate clip from the selected first data segment;
editing content in the candidate clip;
saving the candidate clip as a finished clip; and
uploading the finished clip to a social media site.

7. The method of claim 6, wherein editing content in the candidate clip includes adjusting temporal end points of the candidate clip.

8. The method of claim 6, further comprising:
uploading a link to the social media site with the finished clip that redirects a user to the live event.

9. The method of claim 4, wherein the live event reference time includes a delay.

10. The method of claim 9, wherein the delay is at least one of a POI marking delay, a production delay, and a processing delay prior to transcoding the media stream into the data segments.

11. The method of claim 6, wherein the finished clip is at least one of a video clip and audio clip.

12. The method of claim 11, wherein the video clip is made from an audio stream with a slide deck.

13. The method of claim 12, further comprising:
selecting a poster image from the video clip to upload with the finished clip to the social media site.

14. The method of claim 13, further comprising:
editing the poster image with annotations.

15. One or more tangible non-transitory computer-readable storage media encoding computer-executable instructions for executing on a computer system a computer process, the computer process comprising:
receiving, during a live event, a selection of a point of interest (POI) in a media stream of the live event, the POI corresponding to a live event reference time during the live event;
inserting into the media stream POI timing metadata containing the live event reference time of the selected POI;
receiving the media stream containing the POI timing metadata and the live event reference time into a transcoder;
transcoding, by the transcoder, the received media stream into data segments responsive to receiving the POI timing metadata in the media stream, each data segment corresponding to a presentation time stamp,
selecting a data segment of the transcoded data segments, the selected data segment corresponding to the presentation time stamp mapped to the live event reference time received in POI timing metadata of the media stream; and
generating a media clip containing the selected data segment for presentation over a communications network during the live event.

16. The one or more tangible non-transitory computer-readable storage media of claim 15, wherein the computer process further comprises:
creating a candidate clip from the selected data segment;
editing content in the candidate clip;
saving the candidate clip as a finished clip; and
uploading the finished clip to a social media site.

17. The one or more tangible non-transitory computer-readable storage media of claim 16, wherein the computer process further comprises:
adjusting temporal end points of the candidate clip.

18. The one or more tangible non-transitory computer-readable storage media of claim 17, wherein the computer process further comprises:
uploading a link to the social media site with the finished clip that redirects a user to the live event.

* * * * *